(12) United States Patent
Ozu

(10) Patent No.: US 6,521,692 B1
(45) Date of Patent: Feb. 18, 2003

(54) MOLDED RESIN ARTICLE AND INK APPLICATORS SUCH AS BALL-POINT PENS

(75) Inventor: Tatsuya Ozu, Kadoma (JP)

(73) Assignee: Sakura Color Products Corporation, Osaka-fu (JP)

( * ) Notice: Subject to any disclaimer, the term of this patent is extended or adjusted under 35 U.S.C. 154(b) by 69 days.

(21) Appl. No.: 09/620,321

(22) Filed: Jul. 22, 2000

(30) Foreign Application Priority Data

Jul. 23, 1999 (JP) ............................................ 11-209607
Sep. 20, 1999 (JP) ............................................ 11-266122

(51) Int. Cl.$^7$ ............................ C08K 3/10; C08K 3/34; C08K 3/40; B43K 7/10
(52) U.S. Cl. ........................ 524/494; 524/403; 524/413; 524/430; 524/435; 401/209; 401/213; 401/215
(58) Field of Search ................................. 524/494, 403, 524/413, 430, 435; 401/209, 213, 215

(56) References Cited

U.S. PATENT DOCUMENTS 5,037,475 A * 8/1991 Chida et al. ................. 106/403
6,280,837 B1 8/2001 Mizatani et al.

FOREIGN PATENT DOCUMENTS

EP 0 603 830 A2 6/1994
WO WO 96/40449 A1 12/1996

OTHER PUBLICATIONS

Babich, Jeff D. and Edler, Gerhard; Coloring Technology for Plastics: "The Enhancement of Laser Marking Plastic Polymers with Pearlescent Pigments" (1999), pp. 323–326.

* cited by examiner

Primary Examiner—Kriellion A. Sanders
(74) Attorney, Agent, or Firm—Howard C. Miskin; Gloria Tsu-Yip

(57) ABSTRACT

A molded resin article formed of a resin composition is disclosed. The resin composition comprises at least one pigment selected from the group consisting of glass flake pigment particles, metal-coated glass flake pigment particles (the particles being coated with a metal or an oxide thereof), and metal-coated inorganic pigment particles(, said particles being coated with a metal, an alloy thereof or an oxide thereof.)

Also an ink applicator and a ball-point pen is composed of penholder and cap made of the above molded resin.

33 Claims, 6 Drawing Sheets

MOLDED RESIN ARTICLE AND INK APPLICATORS SUCH AS BALL-POINT PENS

FIELD OF THE INVENTION

The present invention relates to a molded resin article for daily use, and more particularly relates to an article of this type such as writing tools for hand-held use and suited for users' taste.

BACKGROUND OF THE INVENTION

Stationery or writing tools including penholders and caps for ball-point pens are usually manufactured by injection molding of a thermoplastic resin such as a polypropylene or a polyethylene. From a practical point of view, it will be sufficient for the polypropylene for injection molding to be blended with an age resister (viz., antioxidant) or the like functional additive. Polypropylenes are however translucent and opal, and polystyrenes are colorless and transparent. Therefore, simple molds of these resins will often fail to satisfy users' ornamental taste.

Thus, hand-held stationery or the like articles have in many cases been made by molding a resin mixture containing a red pigment, a blue pigment or a pigment of any specially selected color to give those articles an ornamental effect. In another case, resin pellets of different colors are used in injection molding so as to produce stream lines or fancy blots in the molded articles. In a further case, an aluminum powder or any other suitable metal powder is added to a raw resin to provide molded articles of a metallic appearance.

There has not been employed any surprising method other than a monotonous coloring or blotting of molded articles or blending a metal powder, such as aluminum powder, to decorate molded resin articles in an ornamental fashion.

SUMMARY OF THE INVENTION

The present invention desirably provides molded resin articles and a resin composition with an enhanced visual appearance.

The present invention seeks to provide molded resin articles of an epoch-making ornamental effect.

A molded resin article of the present invention is formed of a resin composition, the resin composition comprising at least one pigment selected from the group consisting of glass flake pigment particles, metal-coated glass flake pigment particles (said particles being coated with a metal or an oxide thereof), and metal-coated inorganic pigment particles („said particles being coated with a metal, an alloy thereof or an oxide thereof.)

Further, an ink applicator of the present invention comprises a penholder and a cap, both of them being formed of a resin composition, the penholder and/or the cap being transparent or translucent and the resin composition comprising at least one pigment selected from the group consisting of glass flake pigment particles, metal-coated glass flake pigment particles („said particles being coated with a metal or an oxide thereof); and metal-coated inorganic pigment particles („said particles being coated with a metal, an alloy thereof or an oxide thereof.)

A resin composition in accordance with the present invention comprises a resin and pigment particles selected from the group consisting of glass flake pigment particles, metal-coated glass flake pigment particles („said particles being coated with a metal or an oxide thereof), and metal-coated inorganic pigment particles („said particles being coated with a metal, an alloy thereof or an oxide thereof.).

BRIEF DESCRIPTION OF THE PREFERRED EMBODIMENTS

Figure 1:
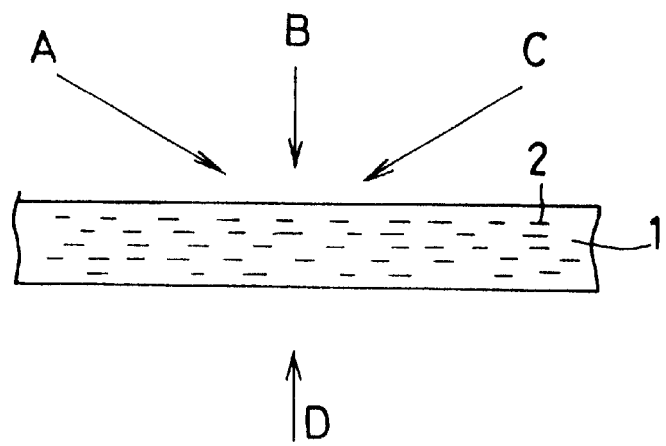
FIGS. 1(a) through (d) are schematic views showing the principle functioning of ray-reflection and ray-passing through in the present invention.
Figure 1:
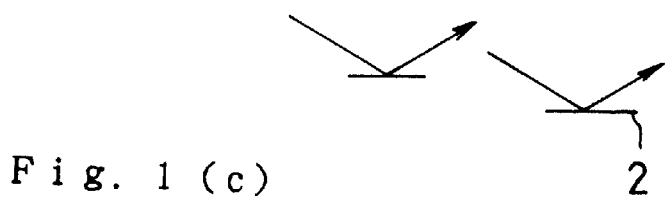
Figure 1:
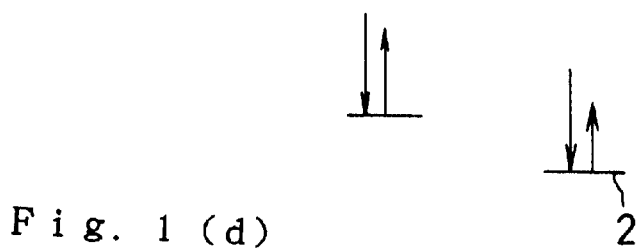
Figure 1:
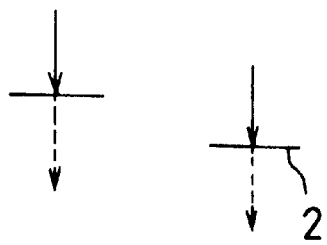

A molded resin article of the present invention is formed of a resin composition, the resin composition comprising at least one pigment selected from the group consisting of glass flake pigment particles, metal-coated glass flake pigment particles (said particles being coated with a metal or an oxide thereof), and metal-coated inorganic pigment particles („said particles being coated with a metal, an alloy thereof or an oxide thereof.)

Further, an ink applicator of the present invention comprises a penholder and a cap, both of them being formed of a resin composition, the penholder and/or the cap being transparent or translucent and the resin composition comprising at least one pigment selected from the group consisting of glass flake pigment particles, metal-coated glass flake pigment particles(, said particles being coated with a metal or an oxide thereof); and metal-coated inorganic pigment particles(, said particles being coated with a metal, an alloy thereof or an oxide thereof.)

A resin composition in accordance with the present invention comprises a resin and pigment particles selected from the group consisting of glass flake pigment particles, metal-coated glass flake pigment particles(, said particles being coated with a metal or an oxide thereof), and metal-coated inorganic pigment particles(, said particles being coated with a metal, an alloy thereof or an oxide thereof.)

From an aspect of the present invention, a molded resin article is characteristically formed of a resin composition containing at least one kind of a glass flake pigment, a coated pigment whose glass flakes are coated with silver or nickel, a further coated pigment whose glass flakes are coated with titanium and a metal-coated inorganic pigment so as to achieve the object just mentioned above.

The molded resin article in accordance with the present invention containing the "glass flake pigment" will dazzle from inside due to this pigment composed of mirror-like fine particles distributed in said molded article. This appearance is quite different from that of the prior art simple monochrome resin articles or stream-lined ones from an ornamental point of view. In particular, in the present invention the glass flakes have each a highly smooth surface so that the molded resin article containing same will be of an intensive visual effect of brilliancy, as compared with the prior metallic-colored molded resin articles having an aluminum powder dispersed therein.

In a case wherein glass flakes coated with silver or nickel are contained in molded resin articles, a higher reflectivity will render the molded articles especially brilliant. In an alternative case wherein glass flakes coated with titanium are contained in the molded resin articles, internal interference of light beams will afford a unique color, such as a rainbow-like color, to the interior of each molded article.

The "metal-coated inorganic pigment" referred to herein and employed herein is a general term for pigments whose particles are coated with at least one of metals and oxides thereof.

A metal molecule layer that may be formed, for instance, by the metal vapor deposition method on each particle of metal-coated pigment will also afford an intensive visual effect of high brilliancy, as compared with the prior metallic-colored molded resin articles having an aluminum powder dispersed therein.

In each of the "glass flake pigment", "silver-or nickel-coated glass pigment" and "titanium-coated glass pigment", a coat does cover each glass flake core. If the coat is of a thickness falling within a predetermined range, then light beams reflected by the surface of each coat will interfere with the other ones reflected by the surface of each glass core, thereby producing a unique color or rainbow hues. This effect is most apparent in the case of using the "titanium-coated glass pigment," and a resin composition containing this pigment will provide molded resin articles of the present invention that glitter from their insides.

In some cases, inorganic pigment whose particles are covered each with a metal coat layer of a given thickness are employed herein. Also in this case, light beams reflected by the surface of each layer will interfere with the other light beams reflected by the surface of each pigment core, likewise producing a unique color or rainbow hues.

The coat covering each glass core in the "glass flake pigment", "titanium-coated glass pigment" and "silver-or nickel-coated glass pigment" may have the thickness falling within the given range, as discussed above. Therefore, some light beams will be transmitted through each coat that reflects other beams in a manner similar to mirror surfaces. By virtue of this feature of the glass flake pigments, it will seem to observers seeing the transmitted beams as if each molded resin article of the present invention containing the glass flake pigments was free from any pigment. However, if they catch the reflected light beams, then they will see there intensively brilliant molded resin articles.

A mechanism of this phenomenon may be such as discussed below.

Each molded resin article of the present invention is formed of a resin composition containing a pigment composed of glass particles that are covered respectively with a coat of a metal or an oxide thereof. If the forming of such a molded article 1 is done by the injection molding method, then pigment particles 2 dispersed in the molded product 1 will be oriented in one and the same direction as illustrated in FIG. 1(a).

The molded product on which light is incident from one side in the direction "A" may be looked at from the other side. In this instance, the light beams reflected on mirror-like surfaces of the pigment particles 2 will render the product brilliant. Depending on thickness of each coat, the incident and reflected light beams will interfere one with another to give the product a sparkling special hue or a rainbow color.

The molded product on which light is incident from one side in the direction "A" may not be looked at from the same side to said side in this direction "A." The incident light beams are reflected on the pigment particle surfaces 2 so as to advance in an almost opposite direction as shown in FIG. 1(b), not returning to a user of this product viewing same in one direction "A." In this instance, he or she looking at this product will not see any glass flake pigment 2 or the like present in said product.

In another instance, the light beams will be incident in a direction "B" normal to the molded product 1. If an observer views same from the same front side in the same direction "B" (FIG. 1(a)) then he or she will feel it brilliant due to the light beams reflected on the mirror surfaces of the pigment 2, similarly to the case shown in FIG. 1(c).

In still another instance the observer may look at the product 1 from the rear in the direction "D". See FIG. 1(a). The light beams transmitted through said product and passing by the pigment 2 depicted in FIG. 1(d) will cause the observer not to be aware of any glass flake pigment or the like.

In summary, the coat of a given appropriate thickness covering each glass flake is effective to produce the described unique effect.

This applies also to the metal-coated inorganic pigments if the pigments as well as the kind and thickness of metal coats are selected properly.

The resin for molding the articles of present invention may preferably be transparent or translucent, whether colored or not. In detail, the resin composition may be not only of achromatic colors such as gray but also of any chromatic colors such as blue, yellow, green, red or the like, insofar as it can be seen through visually.

Each of the above-mentioned glass flake pigments (the coated pigment whose glass flakes are coated with silver or nickel, the further coated pigment whose glass flakes are coated with titanium, and the metal-coated inorganic pigment) consists of flat particles with distributed diameters, so the average median diameter of them is preferred to express the sizes of the particles.

An average diameter of the pigment particles contained in a molded resin article in the present invention is preferably from 5.0 to 500 $\mu$m. A smaller diameter less than 5.0 $\mu$m. will render the pigments insufficient in their brilliancy, whilst a larger diameter exceeding 500 $\mu$m. will make it difficult to disperse them homogeneously in the resin composition.

Preferably, about 0.5 to 10.0% by weight of the pigment above may be contained in the resin composition for molded resin articles. A poorer content less than 0.5 wt. % will result in an insufficient brilliancy, with a much richer content beyond 10.0 wt. % making the resin composition less fluidic to impair its moldability, and making the molded resin articles less transparent due to their being entirely clouded with the glass flakes. Thus, a more desirable content of the glass flake pigments is 1.0–5.0 wt. %.

An average thickness of the pigment particles is preferably equal to or less than 5.0 $\mu$m. The pigment particles have various shapes with narrow distribution of their thickness with an average thickness lager than 5.0 μm., pigment particles are too big to disperse easily.

Brilliancy of a molded resin article is reduced as a smaller number of pigment particles are contained in the molded resin article with an average thickness larger than 5.0 μm. To obtain an expected brilliancy with an average thickness larger than 5.0 μm., a larger number of pigment particles with a higher weight percentage should be contained in the molded resin article.

However, in this case, a poor dispersion of the particles occurs because of too many particles.

Using so large a weight of pigment particles with larger average thickness more than 5.0 μm. makes the molded resin article metallic-colored and the above-mentioned interference effect of light beams does not appear.

In the case of molded resin articles containing pigment particles with average thickness equal to or less than 5.0 μm., an optimal weight percentage of pigment particles in the resin molds depends on their average thickness. If the weight percentage of the pigment particles in the resin mold is maintained constant, the number of particles increases as the average thickness decreases, thus reducing the brilliancy of the resin mold. Enough brilliancy can be achieved by adjusting the weight percentage in accordance with the thickness.

From another aspect of the present invention, an ink applicator, such as a fountain pen or a line marker, is comprised of a penholder and a cap made of the above-mentioned molded resin.

This invention can provide ink applicators of an epoch-making ornamental effect with their unique brilliant colors and their internal interference of light beams.

Penholders and caps of the ink applicators in the present invention change their colors under some cases when they are looked at from various directions or they are shined on by lights from various directions. Therefore, the penholders and the caps of same ordinary colors tend to appear as if they have different colors with respect to each other. And in the case of many type of ink applicators each comprising a penholder and a cap matching each other, wherein the penholder and the cap have the same ordinary color in one ink applicator and have a different ordinary color in other ink applicator, the matching of each penholder with each cap tends to be not clear because of their changing colors.

In the present invention the inside of a cap may be partially colored to be of a predetermined unchangeable hue or the same unchangeable hue as the hue of an ink filled in the ink applicator. And the hue of the part being colored as above can be noticed because said ink applicator has some transparent part or some translucent one. Therefore, a cap can be put on a penholder without a failure of their matching of cap to correct penholder.

A preferable average diameter of pigment particles used for molded resin comprising a penholder and a cap of a ink applicator in the present invention ranges from 5.0 to 500 μm. for the reasons mentioned above.

Preferably, about 1.0 to 5.0% by weight of the pigment above may be contained in the resin composition for molded resin articles.

A feature of the present invention is that the inside of said caps or penholders of the ink applicators can be seen from outside. And this feature may be realized by means of the weight of the pigment contained in the molded resin articles being adjusted as set forth above. That makes the cap of an ink applicator in accordance with the present invention capable of being seen through to its inside from its outside and a cap's unchangeable hue mentioned above to be noticed from its outside.

Also an average thickness of the pigment particles is preferably equal to or less than 5.0 μm. for the reasons mentioned above.

From an aspect of the present invention, a ball-point pen is composed of a penholder and a cap which are made of molded resin as mentioned above.

Also, the present invention can provide a ball-point pen of an epoch-making ornamental effect with their unique brilliant colors and their internal interference of light beams by means of the feature mentioned above.

This ball-point pen according to the present invention can be composed of a cap comprising a protector for a penpoint, the protector being secured in the cap and adjacent to an innermost end thereof so as to come into contact with the penpoint resting in the cap, and is colored to be of a predetermined hue.

Thus, said protector guards the distal end of said penpoint thereby inhibiting the ink from evaporation out of said penpoint by means of composition mentioned above and putting on the cap to the penholder, whereby the penpoint comes into contact with the protector.

Also, the ball-point pen of the present invention can be seen through at its inner protector from outside of said ball-point pen because it has some transparent part or some translucent one, and said protector's hue (being in part colored as mentioned above) can be noticed.

Therefore, caps and penholders in the present invention can be rightly matched with each other by means of a kind of marker with the above protector's hue.

Especially, said caps can be rarely put on wrong penholders since said protector's hue is met with the same hue as that of an ink filled in the ball-point pen.

A penpoint of said protector can be shaped into a sphere whereby it can be protected and the ball-point pen in this invention can get ornamental effect.

Also, an average diameter of pigment particles used for molded resin articles as a penholder and a cap of a ball-point pen in this invention is preferably from 5.0 to 500 μm., and preferably about 1.0 to 5.0% by weight of said pigment may be contained in the resin composition of the present invention for molded resin articles, and an average thickness of said pigment particles is preferably equal to or less than 5.0 μm., for the reasons mentioned above.

Glass Flake Pigments

In the present invention, the glass flake pigments are defined each as a pigment comprising glass flakes coated with a metal or its oxide and giving brilliant visual sensations. They may comprise in some cases the glass flakes that are electrolytically plated to be covered each with such a metal or metal-oxide coat. Examples of silver-coated glass flake pigments made by the Nippon Sheet-Glass Co., Ltd. are "Metashine RCFSX-5480 PS," "Metashine-5230 PS," "Metashine-5150 PS" (respectively corresponding to the product codes 9023, 9024 and 9025 of the said company), "Metashine-5090 PS02", "Metashine-5090 PS06" and "Metashine-5030 PS".

The nickel-coated glass flake pigments usable herein and made by the Nippon Sheet-Glass Co., Ltd. are for example "Metashine RCFSX-5480 NS and -5480 NB," "Metashine-5230 NS and 5230 NB," "Metashine-5150 NS and -5150 NB," "Metashine-5090 NS and -5090 ND" and "Metashine-5030 NS and -5030 NB" (respectively corresponding to the product codes 9041-45 and 9050-54).

Examples of the titanium-coated glass flake pigments are "Metashine RCFSX-5090RC" (corresponding to the company's product codes: 8052, 8053 and 8069-71). Each of these examples causes interference of light beams to render the resin molds brilliantly and uniquely hued or rainbow-colored.

Other types of metal-coated glass flake pigments are such that their flakes are coated with a proper metal by the sputtering method. Examples of the silver-coated glass flake pigments are "Crystal-Color GF 2125", "Crystal-Color 2125 M", "Crystal Color 2140" and "Crystal Color 2140 M", all being the product names of the Toyo Aluminum Co., Ltd.

Nickel-chromium-molybdenum alloy-coated pigments made by Toyo Aluminum and also employable herein are "Crystal-Color GF 2525", "Crystal-Color 2525 M", "Crystal-Color 2540" and "Crystal Color 2540 M".

A brass-coated pigment "GF 250", a silver-alloy-coated pigment "GF 1345" and a titanium-coated one "GF 1445" from Toyo Aluminum are also usable.

An average diameter of the glass flake pigment particles in the present invention is preferably from 5.0 to 500 μm. A smaller diameter less than 5.0 μm. will render the pigments insufficient in their brilliancy, whilst a larger diameter exceeding 500 μm. will make it difficult to disperse them homogeneously in the resin composition.

Preferably, about 0.5 to 10.0% by weight of the glass flake pigment may be contained in the resin composition for molded resin articles of the present invention. A poorer content less than 0.5 wt. % will result in an insufficient brilliancy, with a much richer content beyond 10.0 wt. % making the resin composition less fluidic to impair its moldability and to make it less transparent. A more desirable content of the glass flake pigments is 1.0–5.0 wt. %.

Thus, said molded resin article can be given their brilliancy and their inner protector's hue colored portion can be easily noticed from the outside.

Glass flake pigment particles are flat shaped and their average thickness is equal to or less than 5.0 μm. And an optimum content of the glass flake pigments in molded resin articles is determined by said average thickness to give the molded resin articles enough brilliancy.

Metal-Coated Inorganic Pigments

The metal-coated inorganic pigments used herein are pigments whose particles are coated with a metal, its alloy or its oxide by the vapor depositing method. An aluminum powder whose particles are coated with iron (III) oxide may, for instance be employed. Examples of this type pigments are: "Paliocrom Gold L2000/L2002", "Paliocrom Gold L2020/L2022", "Paliocrom Gold L2025" and "Paliocrom Gold L2800", all being the product names of the BASF GmbH. Mica coated with iron (III) oxide may alternatively be used, and examples of them are "Paliocrom Red Gold L2500" and "Paliocrom Red L4000."

In another case, a mica-like iron (III) oxide coated with an aluminum-manganese alloy may be used. Examples are "Paliocrom Copper L3000" and "Paliocrom Copper L3001."

In still another case, mica coated with a reduced titanium dioxide is used. Its examples are "Paliocrom Blue Silver L6000" and "Paliocrom Blue Silver L6001." Mica coated with titanium dioxide (not reduced) is also usable.

Similarly to the cases wherein the glass flake pigments are employed, an average diameter of the metal-coated pigment particles in the present invention is preferably from 5.0 to 500 μm. A smaller diameter less than 5.0 μm. will render the pigments insufficient in their brilliancy, whilst a larger diameter exceeding 500 μm. will make it difficult to disperse them homogeneously in the resin composition.

Also similarly to the cases of glass flake pigments, about 0.5 to 10.0% by weight of the metal-coated inorganic pigment may be contained in the resin composition for molded resin articles. A poorer content less than 0.5 wt. % will result in an insufficient brilliancy, with a much richer content beyond 10.0 wt. % making the resin composition less fluidic to impair its moldability. Thus, a more desirable content of the metal-coated inorganic pigments is 1.0–5.0 wt. %.

Resins

Also an average thickness metal-coated inorganic pigment particle is equal to or less than 5.0 μm., and an optimum content of them in molded resin articles is determined by said average thickness to give the molded resin articles enough brilliancy.

The resins adapted for use herein are thermoplastic ones capable of being injection molded and/or extruded. Examples of such resins include: polyethylenes, polypropylenes, polystyrenes, ABS resins, methacrylates, vinyl chlorides, polyethylene terephthalates, polybutylene terephthalates, AS resins, EVA resins, cellulose acetates, polycarbonates, polyamides, polyacetal resins, modified polyphenylene oxides, polysulfone resins and the like.

Among these resins, colorless transparent ones or white translucent ones such as polyethylenes, polypropylenes, polystyrenes, ABS resins, methacrylates, vinyl chlorides, polyethylene terephthalates, polybutylene terephthalates and cellulose acetates are particularly recommenced.

Other Additives

If necessary, the resin composition may further contain any proper additives such as a weather resistance improving agent, a heat resistance improving agent, an antistatic agent, a foaming agent, a repellant, a slip additive, a nucleating agent, a plasticizer, an anti-aging or durability-improving agent, a hydrogen chloride-absorber, an antioxidant and the like. Any pigments other than those discussed above can be added. However, an overall amount of all the pigments must not exceed a limit unless the resin mold should become opaque.

EXAMPLE 1

A polypropylene (of a trade name "MG03B" made by the Poly-Chem Co., Ltd.) was used as the resin. Blended with this resin was 2% by weight of a glass flake pigment (whose trade name was "RCFSX-5090 RC" corresponding to the product code 8069, made by the Nippon Sheet-Glass Co. Ltd., and whose constituent particles were covered each with a titanium layer so as to be of an average diameter of about 90 μm.). These ingredients were weighed and then mixed with each other within a blender, before molten and kneaded in an extruder to give pellets of the resin composition. Subsequently, these pellets were injection-molded to form a cap 12 and a pen-holder or shaft 15 for a ball-point pen as figure shown in FIG. 2. This penholder, that is an article surrounding a cylindrical ink reservoir 16, will be held by the hand of a user when he or she will write characters or the like. The thus-molded cap 12 and penholder 15 constitute for example a ball-point pen called "Ball-Sign" (a trademark) that is a product of the Sakura Cray-Pas Co., Ltd. The summit, or closed end, of said cap 12 is of a semispherical shape.

Each of the molded cap 12 and penholder 15 was of a milk white color and translucent. A number of fine bluish dots were seen to twinkle in surfaces of those cap 12 and penholder 15 due to interference when viewed from a direction opposite to another direction in which the reflected light beams ran. This appearance resembled a night sky covering a highland and filled with a number of twinkling stars. When seen from upstream in the incident direction of light beams, any small brilliant dots were not observed in the body of the cap 12 and penholder 15, rendering them ordinary in visual sensations. In this state of those articles, such glass flake pigment particles were "hidden" in the bodies of said cap and penholder and thus out of the user's sight.

Fine twinkling dots were, however, sensed always in the semispherical summit of the cap 12 molded in the described manner, in whichever direction it was seen. Therefore, the structure of the present invention is suited in particular to molded resin articles each having a round or spherical portion.

EXAMPLE 2

Alternatively to EXAMPLE 1, in place of above glass flake pigments in the preceding example, here employed was another glass flake (whose trade name was "RCFSX-5090 RC" corresponding to the product code 8052, made by the Nippon Sheet-Glass Co. Ltd., and whose constituent particles were covered each with a titanium layer so as to be of an average diameter of about 90 $\mu$m.). A cap 12 and a penholder 15 were made by same the way as EXAMPLE 1.

In this embodiment a number of fine brilliant golden dots were seen when viewed from a side to where the reflected light beams advanced. The reason why a cap 12 and a penholder 15 were seen as different brilliant color from the one of EXAMPLE 1 is thought to be because their different thickness of titanium layer in their glass flake pigment particles.

With regard to a principle of the present invention being the application of the interference of light beams as mentioned above, variable thickness of titanium layer in glass flake pigments makes molded resin articles brilliant with varying color whereby their wave length is amplified by the interference of light beams.

EXAMPLE 3

A small amount of a blue pigment was added to the resin composition described in EXAMPLE 1, so as to prepare pellets for use to injection mold a cap 12 and penholder 15 similar to those which have been discussed above. Thus, these articles 12 and 15 in EXAMPLE 2 were bluish and translucent as a whole. A number of fine brilliant silvered dots were seen when viewed from a side to where the reflected light beams advanced. Although the pigment particles 2 in EXAMPLE 1 assumed a bluish tone, those in this EXAMPLE 2 were seen silver-colored. This is because the small amount of blue pigment in the resin composition absorbed a wavelength range corresponding to the bluish color of the pigment 2.

When seen from upstream in the incident direction or seen from rear in the incident direction of light beams, any small brilliant dots were not observed in the cap 12 and penholder 15, rendering them ordinary in visual sensations.

EXAMPLE 4

In place of the glass flake pigments in the preceding examples, here employed was a metal-coated inorganic pigment "Paliocrom Blue Silver L6021" (a trademark) made by the BASF GmbH, its median diameter being 4–20 $\mu$m. This resin composition was likewise molded into a cap 12 and a penholder 15, and a number of fine bluish dots were seen to twinkle in surfaces of those cap and penholder when viewed from a direction opposite to another direction in which the reflected light beams ran. This appearance resembled a night sky covering a highland and filled with a number of twinkling stars.

EXAMPLE 5

Figure 2:
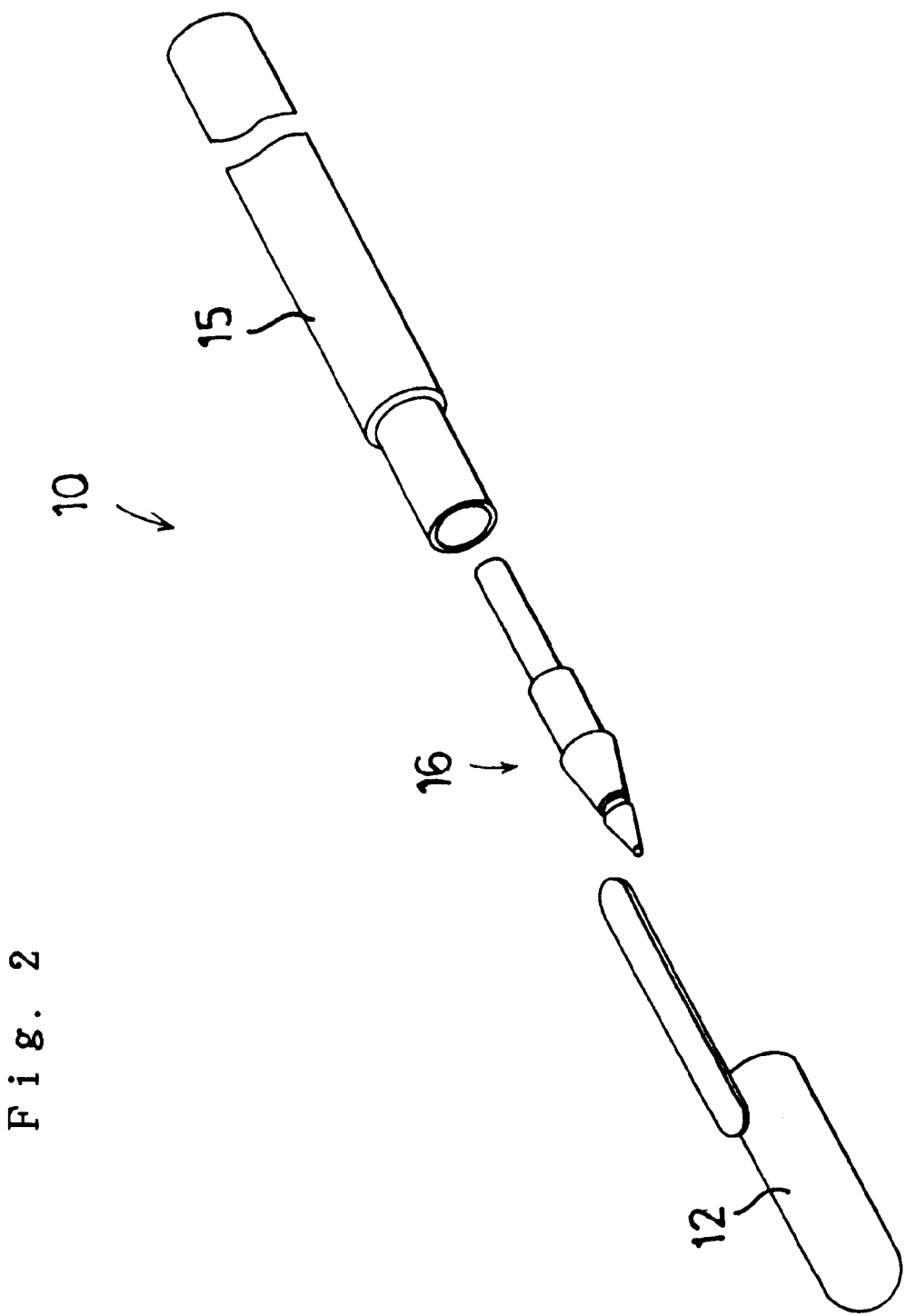
FIG. 2 is an exploded perspective view of a ball-point pen along with its cap provided in some embodiments.
Figure 3:
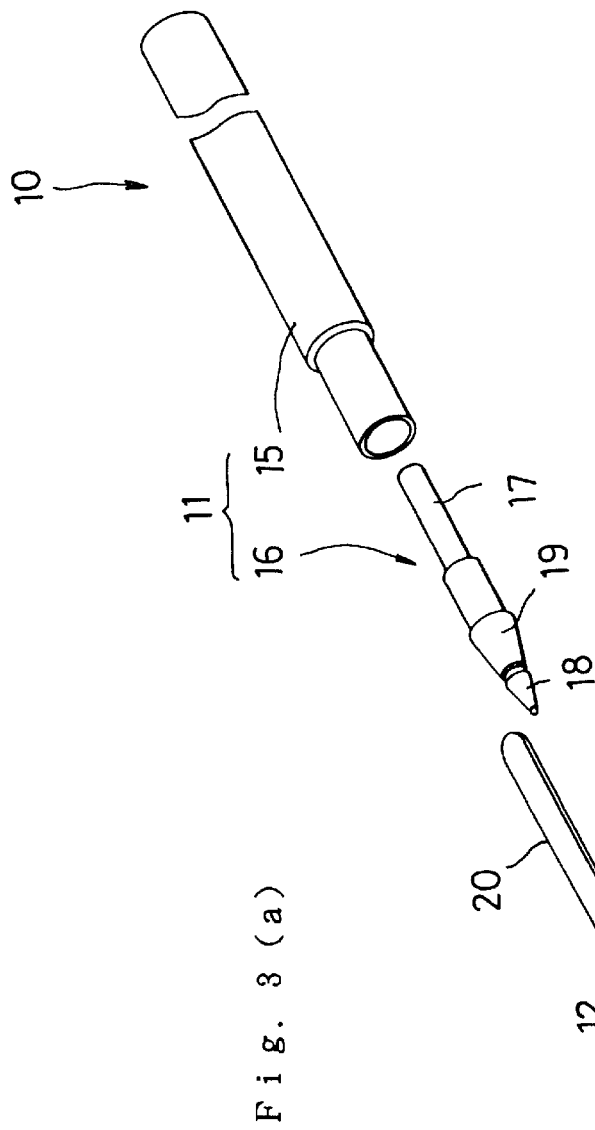
FIG. 3(a) is an exploded perspective view of this ball-point pen along with its cap provided in another embodiment.
FIG. 3(b) is a view of cross sectional view of a ball-point pen cap in said another embodiment.
Figure 3:
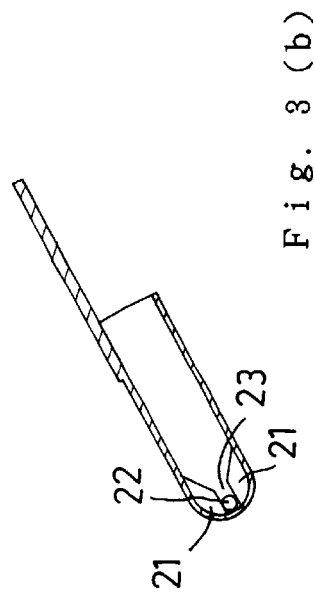
Figure 4:
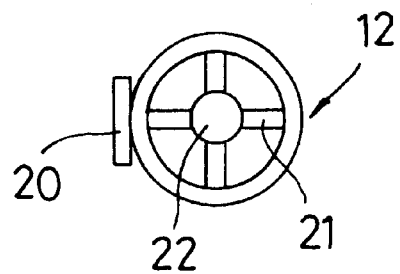
FIG. 4(a) is a plan view of a cap provided in another embodiment.
FIG. 4(b) is a side view of a ball-point pen being put with its cap (shown in cross-section) in said another embodiment.
Figure 4:
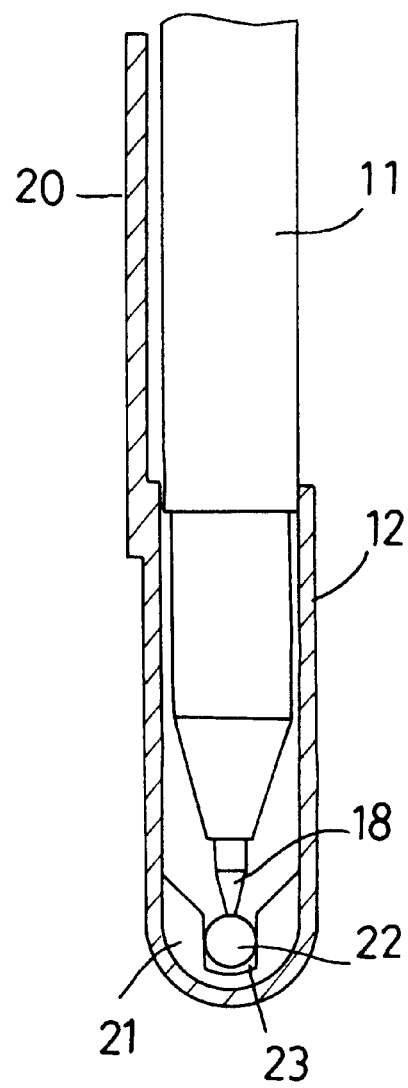
Figure 5:
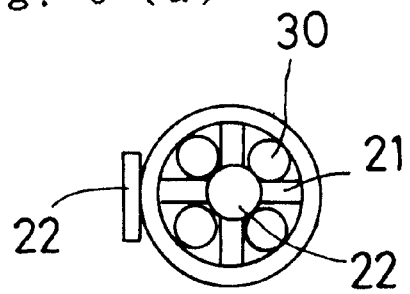
FIG. 5(a) is a plan view of a cap provided in still another embodiment.
FIG. 5(b) is a view of a ball-point pen being put with its cap (shown in cross-section) in said still another embodiment.
Figure 5:
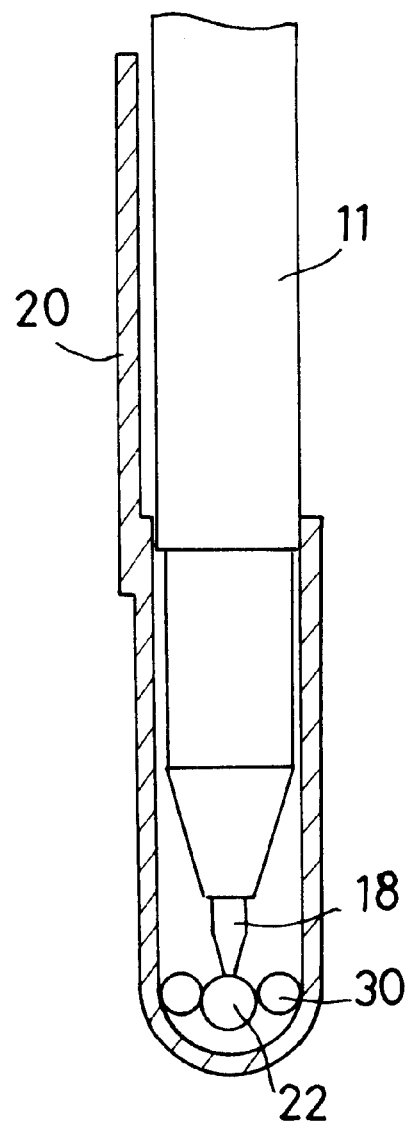

Now some examples of the present invention will be described referring to embodiments shown in the drawings, in which FIG. 2 is an exploded perspective view of a ball-point pen 10 whose cap 12 is shown also in cross section in a first embodiment. FIG. 3(*a*) is an exploded perspective view of this ball-point pen 11 and cap 12 provided in another embodiment and FIG. 3(*b*) is a cross sectional view of a ball-point pen cap in said another embodiment. FIG. 4(*a*) is a plan view of the cap provided in a further embodiment and FIG. 4(*b*) is a cross sectional view of a ball-point pen being put with its cap in said further embodiment. FIG. 5(*a*) is a plan view of the cap provided and FIG. 5(*b*) is of cross sectional view of a ball-point pen being put with said cap in a still further embodiment.

In this embodiment, the ball-point pen (as, an applicator) 10 comprises of a body 11 and a cap 12. The body 11 comprises, in turn, a penholder 15 and an ink cartridge 16 which is of a structure identical with that of the known aqueous ink ball-point pens. Thus, an ink reservoir 17 is connected by a distal plug 19 to a penpoint tip 18 so to constitute as a whole the ink cartridge 16. The ink reservoir 17 may, for instance, be filled with a red aqueous gel ink.

Both the penholder 15 and the cap 12 are injection-molded using a translucent resin-based composition in which a pigment as specified herein is dispersed. Employed as this resin was a polypropylene (its product name or code being "MG03B" made by the "Nihon Poly-Chem Co., Ltd.) with which 1% by weight of a glass flake pigment was mixed. This pigment was a product "RCFSX 5090RC" of the code 8052, made by the Nippon Sheet-Glass Co. Ltd., with its particles having an average diameter of 90 $\mu$m. and covered each with titanium. The polypropylene matrix and the pigment were weighed before being mixed within a blender and melted and kneaded within an extruder to form pellets. These pellets were used to injection mold the penholder 15 and the cap 12, respectively.

Similarly to the conventional ones, the penholder 15 was of a cylindrical shape.

The cap 12 had a semi-spherical summit, or terminus, at its closed end, and had a clip 20 composed integrally with an outer periphery of said cap.

As seen in FIG. 3(*b*), four ribs 21 were formed integral with an inner periphery of the summit in the cap 12, so as to extend from this periphery towards a center but to terminate short of a central zone. The ribs 21 taking an innermost position in the cap 12 were of the same shape and tapered at their end portions facing an opening of the cap. A penpoint protector (viz., a colored member) 22 had been prepared as a discrete member and was tightly fitted in a central cavity 23 that was thus surrounded by centripetal sides of those four ribs. This protector, that was a spherical member made of an elastomer such as a silicone rubber, will contact and guard the distal end of the penpoint tip 18, thereby inhibiting the ink from evaporation out of said tip end.

In this embodiment, the penpoint protector 22 was of a required particular color, and exemplarily assumed substantially the same reddish hue as the ink with which the reservoir was filled. The term "same hue" used herein need not mean colors having the strictly same spectrum but is intended to denote some hues that are usually regarded inclusively as "reddish hues," "bluish hues" or "yellowish hues," for instance.

The cap 12 in this embodiment was mainly composed of a translucent resin and the spherical penpoint protector 22 of the reddish color was fixed therein, so that the latter can be seen from outside through the cap. It is particularly noted here that the four ribs 21 supporting and holding the protector merely at narrow zones thereof will render it to assume as if wholly exposed and suspended in midair. Thanks to this feature, the users of this pen can easily see and readily confirm through its cap 12 the inside reddish protector 22.

Both the cap 12 and penholder 15 were milky-white and translucent in this embodiment. Consequently, a view of them in a direction against the reflected light beams making interference with each other did give the sight of a number of bluish brilliant dots as if the starry night sky above a highland had been seen. If, however, the cap was looked at in the direction of the incident light beams or against the transmitted light beams having penetrated the cap, then those bluish dots of the glass flake pigment particles were hidden to return it to its natural external appearance.

In any case, the spherical protector 22 for the penpoint 18 was capable of being sensed visually from outside and through the cap 12, including its color being "red." This cap could be identified for mating with a correct penholder whose ink was red, but not of any other color, in whichever direction it had been viewed. Thus, the cap provided in this embodiment was of such a feature that it would scarcely be taken to be put on a wrong penholder.

In addition, this cap 12 had the semispherical summit so that a number of brilliant fine dots could be sensed regardless of the directions in which it was looked at. Those bright dots assumed "planets" around the central and spherical colored protector 22 if the latter had been imagined to be the "sun," thereby adding a further ornamental value to the cap.

Any of the metal-coated inorganic pigments exemplified above could be used in place of such a glass flake pigment to be blended with a resin composition, without affecting the decorative effect described above.

Figure 6:
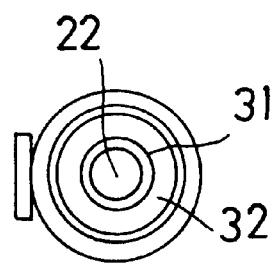
FIG. 6(a) is a plan view of a cap provided in yet another embodiment.
FIG. 6(b) is a view of a ball-point pen being put with its cap (shown in cross-section) in said yet another embodiment.
Figure 6:
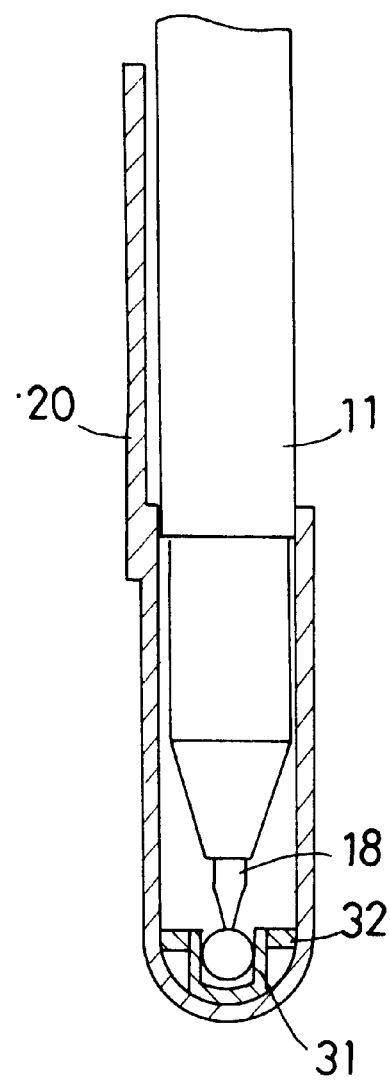

Although the penpoint protector 22 was colored in the preceding embodiment, it was possible to dispose any additional colored balls 30 deep in the cap and around the protector. In this alternative fashion or second embodiment shown in FIGS. 5(a) and 5(b), each ball 30 was secured in an interstice between two adjacent ones of four ribs 21. In another alternative, or third, mode which FIGS. 6(a) and 6(b) illustrate, an annular protrusion 31 standing up from the bottom of the cap to fit on the penpoint protector 22. A flange-shaped part 32 surrounding the cylindrical protrusion 31 might also be colored and secured in this cap. In this case, both the ball 30 and the flange-shaped part 32 would function as the colored member.

While the present invention is described above for use with ball-point pens, it is, however, applicable also to any other types of applicators such as fountain pens, felt pens and line markers.

As described above, the molded resin article according to the present invention is formed of a resin composition containing a pigment having brilliancy that affords a novel visual effect not achieved by the conventional technique.

In addition, an applicator and/or a ball-point pen according to the present invention is formed of a resin composition containing a pigment having brilliancy that affords a novel visual effect.

In summary, the cap may be formed of a resin composition blended with a glass flake or other type pigment in accordance with the present invention to afford a novel visual effect. A colored member fixed in the cap is visible from outside so as to prevent it from being erroneously put on a wrong penholder. Such a colored member embedded in a transparent or translucent body adds a further ornamental effect to the cap.

The preceding description and drawings are given for the purpose of illustration and not limitation. Material substitutions and variations are possible without departing from the invention.

Accordingly, the invention is to be limited only by the scope of the following claims.

What is claimed is:

1. A molded resin article formed of a resin composition, said resin composition comprising at least one pigment selected from the group consisting of
    a) glass flake pigment particles,
    b) metal-coated glass flake pigment particles, said particles being coated with a metal or an oxide thereof, and
    c) metal-coated mica particles, said particles being coated with a metal, an alloy thereof or an oxide thereof.

2. A molded resin article as defined in claim 1, characterized in that said metal-coated flake pigment particles are coated with silver, nickel or titanium.

3. A molded resin article as defined in claim 1, characterized in that a coat covering said pigment particles is of a thickness sufficient to provide an interference color.

4. A molded resin article as defined in claim 1, characterized in that a coat covering said pigment particles is capable of partially transmitting light beams through said coat.

5. A molded resin article as defined in claim 1, characterized in that the article is transparent or translucent as a whole.

6. A molded resin article as defined in claim 1, characterized in that an average diameter of the pigment particles contained in the molded resin article is from about 5.0 to about 500 $\mu$m.

7. A molded resin article as defined in claim 1, characterized in that about 1.0 to about 5.0% by weight of said pigment is contained in said resin composition.

8. A molded resin article as defined in claim 6, characterized in that the pigment particles have a flat shape and an average thickness of the pigment particles is equal to or less than about 5.0 $\mu$m.

9. An ink applicator comprising a penholder and a cap, wherein both of them are formed of a resin composition, said penholder and/or said cap being transparent or translucent and said resin composition comprising at least one pigment selected from the group consisting of
    a. glass flake pigment particles,
    b. metal-coated glass flake pigment particles, said particles being coated with a metal or an oxide thereof; and
    c. metal-coated mica particles, said particles being coated with a metal, an alloy thereof or an oxide thereof.

10. An ink applicator as defined in claim 9, characterized in that said metal-coated glass flake pigment particles are coated with silver, nickel or titanium.

11. An ink applicator as defined in claim 9, characterized in that a coat covering said pigment particles is of a thickness sufficient to provide an interference color.

12. An ink applicator as defined in claim 9, characterized in that a coat covering said pigment particles is capable of partially transmitting light beams through said coat.

13. An ink applicator as defined in claim 9, characterized in that an average diameter of the pigment particles contained in the molded resin article is from about 5.0 to about 500 μm.

14. An ink applicator as defined in claim 13, characterized in that about 1.0 to about 5.0% by weight of said pigment is contained in the said resin composition.

15. An ink applicator as defined in claim 13, characterized in that the pigment particles have a flat shape and an average thickness of the pigment particles is equal to or less than about 5.0 μm.

16. An ink applicator as defined in claim 9, characterized in that the cap further comprises a colored member of a predetermined hue, said colored number being fixed in the cap.

17. An ink applicator as defined in claim 16, characterized in that the hue of said colored member is the same as that of an ink filled in the ink applicator.

18. A ball-point pen comprising a penholder and a cap, wherein both of them are formed of a molded resin composition, said penholder and/or said cap being transparent or translucent and said resin composition comprising at least one pigment selected from the group consisting of
   a. glass flake pigment particles,
   b. metal-coated glass flake pigment particles, said particles being coated with a metal or an oxide thereof; and
   c. metal-coated mica particles, said particles being coated with a metal, an alloy thereof or an oxide thereof.

19. A ball-point pen as defined in claim 18, characterized in that said metal-coated flake pigment particles are coated with silver, nickel or titanium.

20. A ball-point pen as defined in claim 18, characterized in that a coat covering said pigment particles is of a thickness sufficient to provide an interference color.

21. A ball-point pen as defined in claim 18, characterized in that a coat covering said pigment particles is capable of partially transmitting light beams through said coat.

22. A ball-point pen as defined in claim 18, characterized in that an average diameter of the pigment particles contained in said ball-point pen is from about 5.0 to about 500 μm.

23. A ball-point pen as defined in claim 18, characterized in that about 1.0 to about 5.0% by weight of said pigment is contained in said resin composition.

24. A ball-point pen as defined in claim 22, characterized in that the pigment particles have a flat shape and an average thickness of the pigment particles is equal to or less than about 5.0 μm.

25. A ball-point pen as defined in claim 18, characterized in that the cap further comprises a protector for a penpoint, the protector being secured in the cap and being disposed adjacent to its innermost end so as to come into contact with a penpoint resting in the cap, said protector being colored to be of a predetermined hue.

26. A ball-point pen as defined in claim 25, characterized in that the hue of a protector is the same as that of an ink filled in the ink applicator.

27. A ball-point pen as defined in claim 25, characterized in that the protector comprises a generally spherical shape.

28. A resin composition comprising
   a. a resin and
   b. pigment particles selected from the group consisting of
      i. glass flake pigment particles,
      ii. metal-coated glass flake pigment particles, said particles being coated with a metal or an oxide thereof, and
      iii. metal-coated mica particles, said particles being coated with a metal, an alloy thereof or an oxide thereof.

29. A resin composition as defined by claim 28, characterized in that said metal-coated flake pigment particles are coated with silver, nickel or titanium.

30. A resin composition as defined by claim 28, characterized in that a coat covering said pigment particles is of a thickness sufficient to provide an interference color.

31. A resin composition as defined by claim 28 characterized in that a coat covering said pigment particles is capable of partially transmitting light beams through said coat.

32. A resin composition as defined by claim 28 characterized in that said resin comprises a thermoplastic resin capable of being injection molded or extruded.

33. A resin composition as defined by claim 28, characterized in that said resin comprises:
   polyethylene,
   polypropylene,
   polystyrene,
   ABS resin,
   methacrylate,
   vinyl chloride,
   polyethylene terephtalate,
   polybutylene terephtalate,
   AS resin,
   EVA resin,
   cellulose acetate,
   polycarbonate,
   polyamide,
   polyacetal resin,
   modified polyphenylene oxide and
   polysulfone resin.

* * * * *